G. A. HENDRICKSON.
PISTON RING.
APPLICATION FILED MAY 2, 1914.
1,127,619.
Patented Feb. 9, 1915.
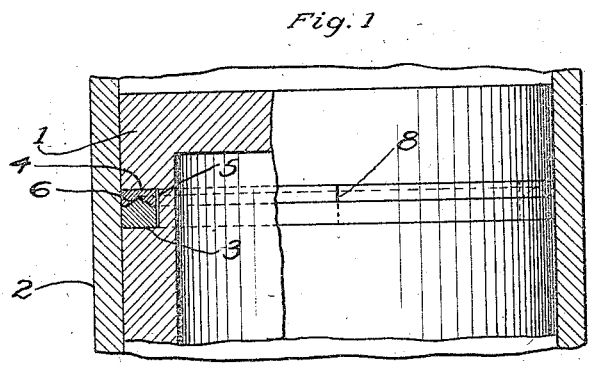
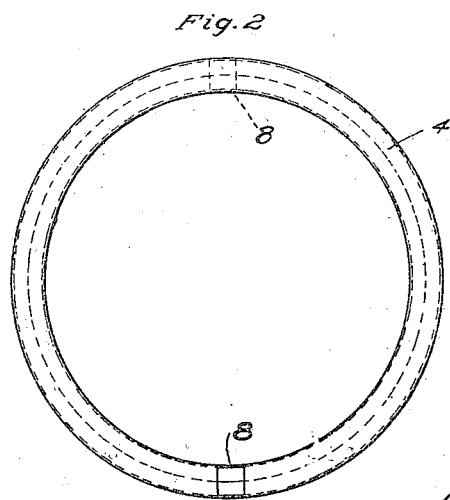
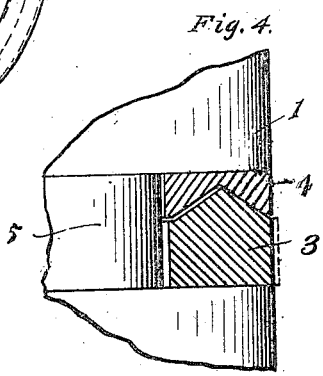
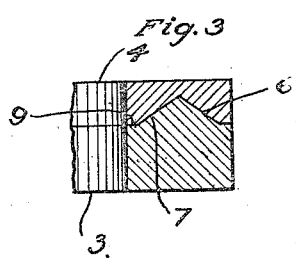
Witnesses:
Walter F. Stone
Robert S. Martin
Inventor:
Gustaf Alfred Hendrickson
By Rummler & Rummler
Attys.

UNITED STATES PATENT OFFICE.

GUSTAF ALFRED HENDRICKSON, OF CHICAGO, ILLINOIS.

PISTON-RING.

1,127,619.

Specification of Letters Patent.

Patented Feb. 9, 1915.

Application filed May 2, 1914. Serial No. 835,820.

*To all whom it may concern:*

Be it known that I, GUSTAF ALFRED HENDRICKSON, a citizen of the United States of America, and a resident of Chicago, in the county of Cook and State of Illinois, have invented certain new and useful Improvements in Piston-Rings, of which the following is a specification.

The main object of this invention is to provide improved packing rings for the pistons of engines arranged to compensate for wear, both on the outer surface of the rings and at the sides of the rings and their containing grooves.

Further objects of the invention are to provide packing rings so designed that they may be easily manufactured and ground to the required size; and to provide a packing consisting of a plurality of coacting split rings which need not be elliptical or of variable thickness to provide for uniform expansion.

An illustrative embodiment of this invention is shown in the accompanying drawings, in which—

Figure 1 is a sectional view partly broken away of an engine cylinder and piston having the improved packing rings. Fig. 2 is a plan detail of a pair of interfitting rings. Fig. 3 is a sectional detail of the packing rings. Fig. 4 is a sectional detail of the packing rings showing how the differential expansion of the rings compensates for wear in all directions, the wear being greatly exaggerated for the sake of clearness.

One feature of this invention is a pair of interfitting split packing rings in which one ring is heavier than the other and consequently has a greater tendency to expand. The expansion of the heavier ring results in compelling the lighter ring to expand with it, but the interfitting surfaces of the two rings are so formed that during such expansion the rings are urged apart to compensate for any wear occurring between the sides of the rings and their containing grooves.

Referring to the drawings, in Fig. 1, a piston 1 is shown within an engine cylinder 2 and is provided with the improved packing consisting of a pair of interfitting or interlocking rings 3 and 4 seated in a groove 5 in the piston. The ring 3 is shown with a V-shaped annular projection 6 on its side and fitting within a corresponding groove 7 in the side of ring 4. The rings also preferably have flat engaging surfaces 9 to avoid sharp edges. A section of each ring is cut away, as indicated at 8 in the drawings, and as is customary to provide for expansion of the rings after the same are forced into their seats in the piston.

In operation such wear as occurs on the outer peripheral surface of the rings is compensated for by their expansion. However, if the sides of the rings or the sides of the grooves 5 are worn, expansion of ring 3 through the inclined surfaces, provided by the ridge and groove in the rings, causes them to spread apart until such wear is compensated for. The further expansion of ring 3 simply results in carrying the ring 4 with it.

It is possible to accomplish the ends of this invention by different constructions than that shown in the drawings, but the one shown is particularly well adapted for the purposes of manufacture, as such rings may be easily handled by ordinary tools during the grinding and fitting operations. In making the packing rings, a cylinder is first cast and then is machined both inside and outside at the same time, in case the inside should not be cast substantially true. The cylinder is then cut transverse to its axis into separate rings. The V-shaped faces on the rings are next cut by suitable shaping tools, after which the pairs of interfitting rings are placed together and rotated relatively to each other for the purpose of grinding the V-shaped faces to exact fit. After the plain faces of the rings are ground to size, the rings are cut open to provide for their contraction to the diameter of the engine cylinder. After cutting the rings a considerable number are placed in a cylindrical jig to compress them approximately to the diameter of the cylinder in which they are to operate; and while they are so compressed they are clamped on a mandrel by pressure applied to the end rings. The interfitting V-shaped surfaces on the sides of the rings are well suited for this purpose, as they serve to lock the rings together and have no tendency under the endwise pressure to expand and be displaced on the mandrel, such as would be the case if the rings were provided with single beveled adjacent faces. Accordingly, they may be removed from the jig and retained on the mandrel in their contracted position, and while on the mandrel the rings are ground to the exact size desired.

In assembling each pair of the rings in their groove in the piston, the openings 8 are staggered, being preferably placed 180° apart. This insures that the expansion and consequently the wear of the rings is uniform throughout their entire peripheries, since the interfitting surfaces of the rings prevent unequal expansion of either at different points in its periphery.

Although but one specific embodiment of this invention has been herein shown and described, it will be understood that numerous details of the construction shown may be altered or omitted without departing from the spirit of this invention as defined by the following claims.

I claim:—

1. A packing for pistons, comprising a pair of split rings having interfitting ridges and grooves of V-shaped cross-section at their adjacent sides.

2. A packing for pistons, comprising a pair of split rings having interfitting ridges and grooves of V-shaped cross-section at their adjacent sides, one of said rings having a greater cross-sectional area than the other.

3. A packing for pistons, comprising a pair of split rings having interlocking wedging surfaces at their sides, said rings being constructed to provide for relative movement sidewise under a differential expansion.

4. A packing for pistons, comprising a pair of expansible rings having interfitting ridges and grooves of V-shaped cross-section at their adjacent sides, one ring having greater expansive strength than the other.

5. A packing for pistons, comprising a pair of expansible rings having interlocking wedging surfaces at their sides, one ring having greater expansive strength than the other.

6. A packing for pistons comprising a pair of split rings having interfitting surfaces at their adjacent sides, one of said rings being heavier than the other, said surfaces having parts shaped to secure said rings against relative expansion when clamped together by pressure applied in an axial direction and having inclined parts shaped to cause said rings to be forced apart axially through differential radial expansion of the rings.

Signed at Chicago this 29th of April, 1914.

GUSTAF ALFRED HENDRICKSON.

Witnesses:
 EUGENE A. RUMMLER,
 WILLIAM E. HANN.